(12) United States Patent
Tatemori et al.

(10) Patent No.: US 8,023,092 B2
(45) Date of Patent: Sep. 20, 2011

(54) LIQUID CRYSTAL DISPLAY DEVICE AND METHOD OF MANUFACTURING LIQUID CRYSTAL DISPLAY DEVICE

(75) Inventors: Shuichi Tatemori, Kanagawa (JP); Masaaki Kabe, Kanagawa (JP); Hidemasa Yamaguchi, Kanagawa (JP); Seiji Uejima, Tokyo (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 12/271,015

(22) Filed: Nov. 14, 2008

(65) Prior Publication Data

US 2009/0147208 A1    Jun. 11, 2009

(30) Foreign Application Priority Data

Dec. 7, 2007    (JP) .................................. 2007-316539

(51) Int. Cl.
*G02F 1/1339* (2006.01)
(52) U.S. Cl. ........................................ 349/156
(58) Field of Classification Search ........................ None
See application file for complete search history.

(56) References Cited

U.S. PATENT DOCUMENTS

| 6,642,986 | B2 | 11/2003 | Melnik et al. | |
| 6,705,584 | B2* | 3/2004 | Hiroshima et al. | 249/155 |
| 2003/0112405 | A1* | 6/2003 | Kim et al. | 349/156 |
| 2005/0237470 | A1 | 10/2005 | Kadotani | |

FOREIGN PATENT DOCUMENTS

| JP | 2002-341354 | 11/2002 |
| JP | 2005-326887 | 11/2005 |
| WO | WO 02/27390 | 4/2002 |

* cited by examiner

*Primary Examiner* — Sung H Pak
(74) *Attorney, Agent, or Firm* — Robert J. Depke; Rockey, Depke & Lyons, LLC

(57) ABSTRACT

Disclosed herein is a liquid crystal display device including, a liquid crystal layer, a first substrate and a second substrate which face each other through the liquid crystal layer therebetween, and a plurality of columnar spacers holding a gap between the first substrate and the second substrate, wherein the plurality of columnar spacers include a first columnar spacer and a second columnar spacer which are formed to be substantially equal in height, and a substrate surface of one of the first substrate and the second substrate is provided with a recess in at least one of a part where to dispose the first columnar spacer and a part where to dispose the second columnar spacer.

6 Claims, 14 Drawing Sheets

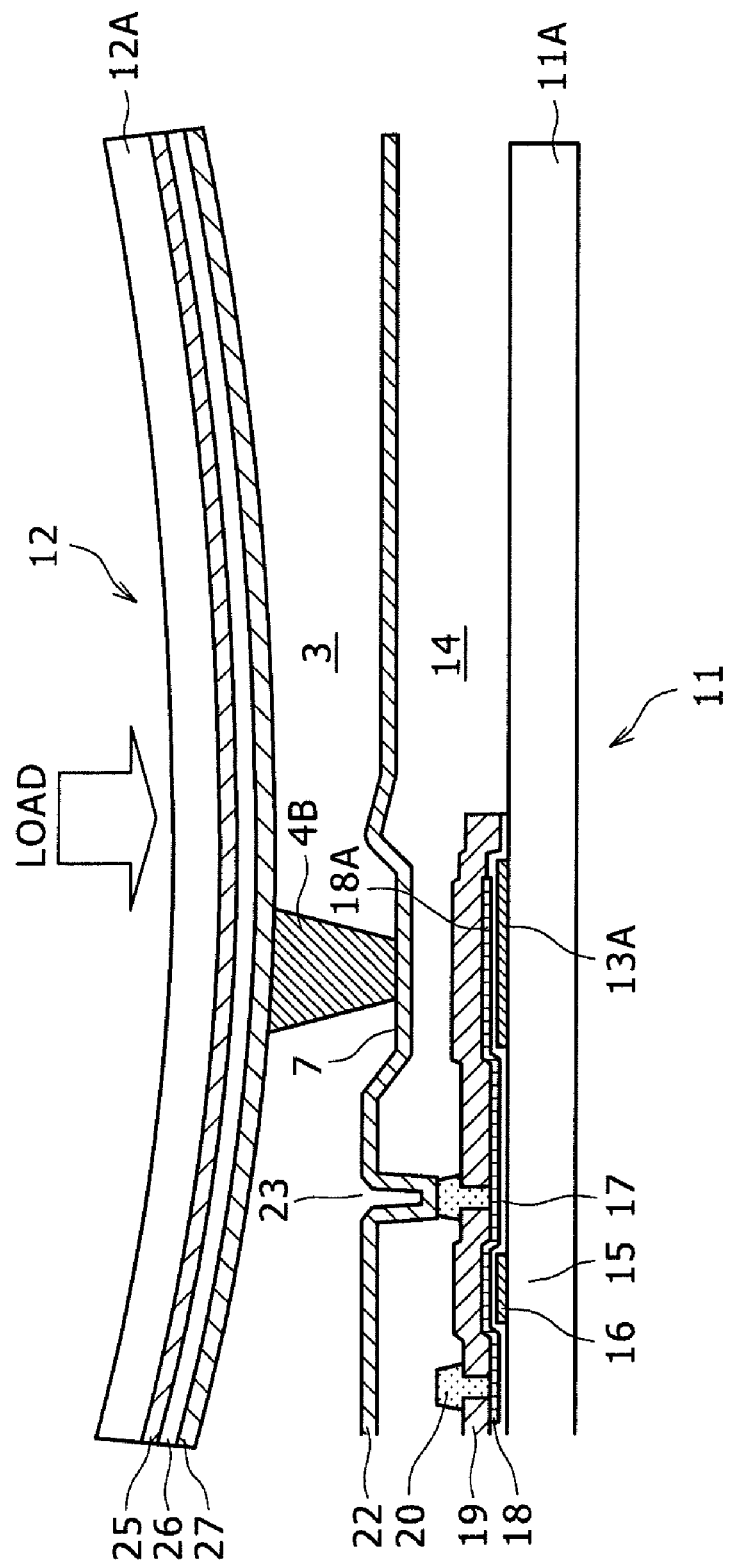

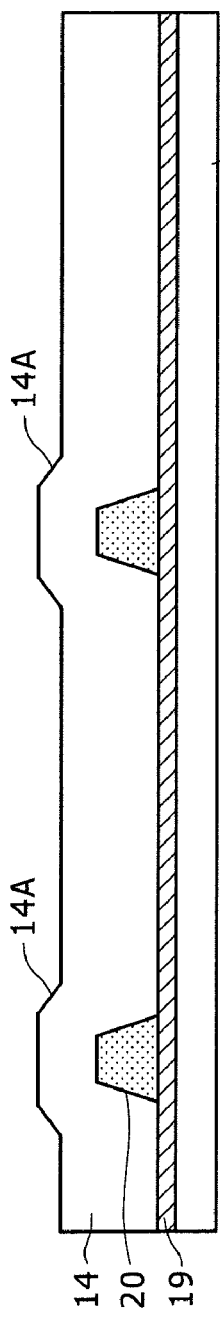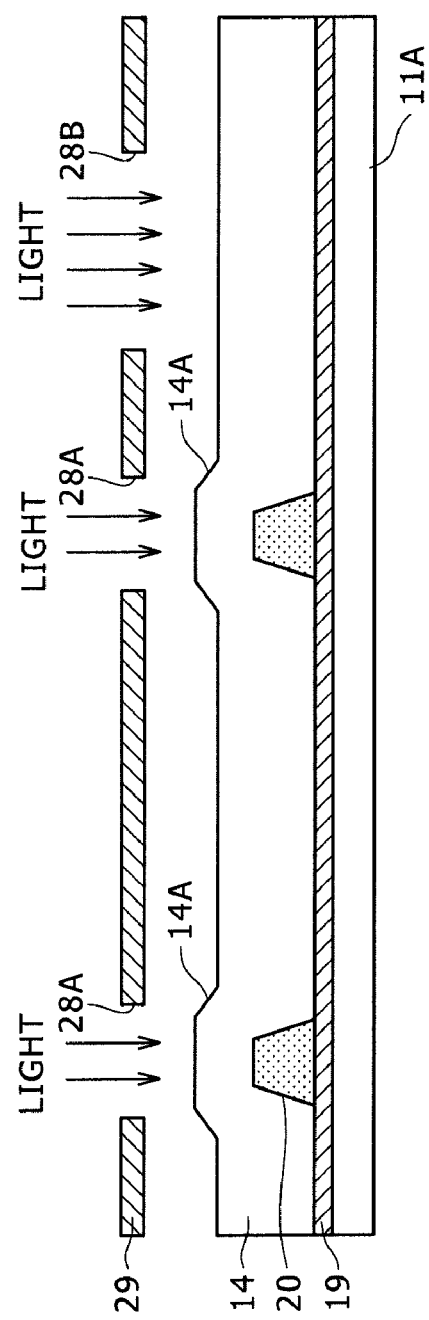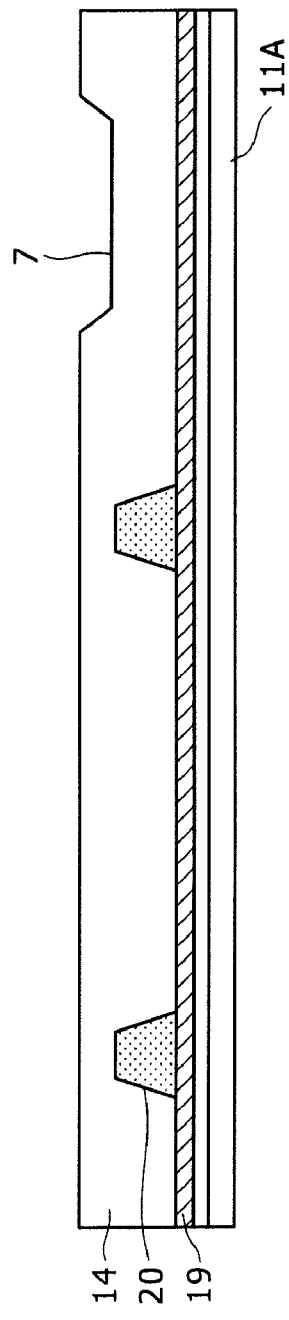

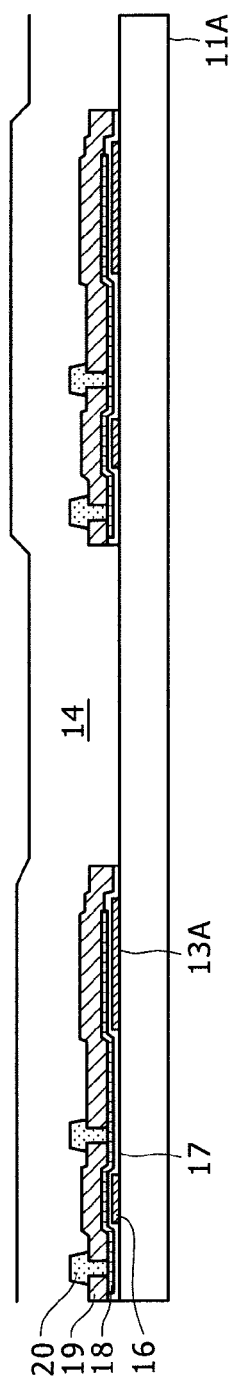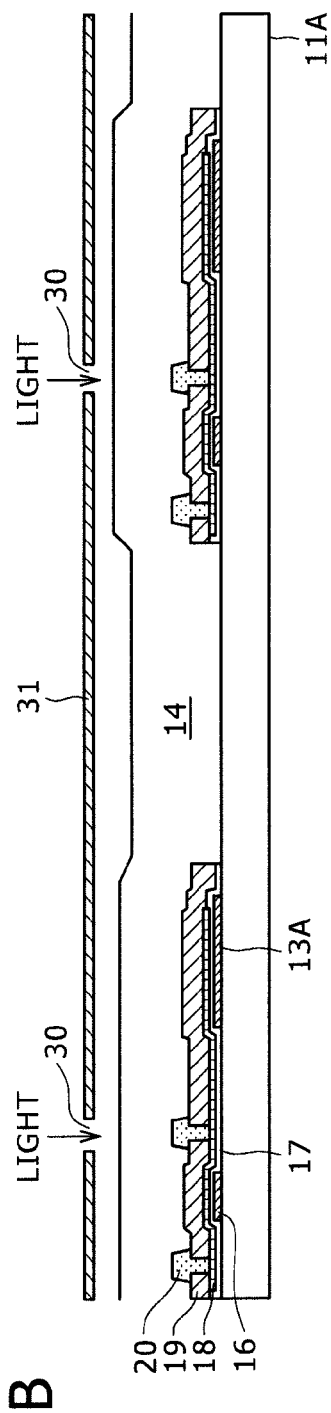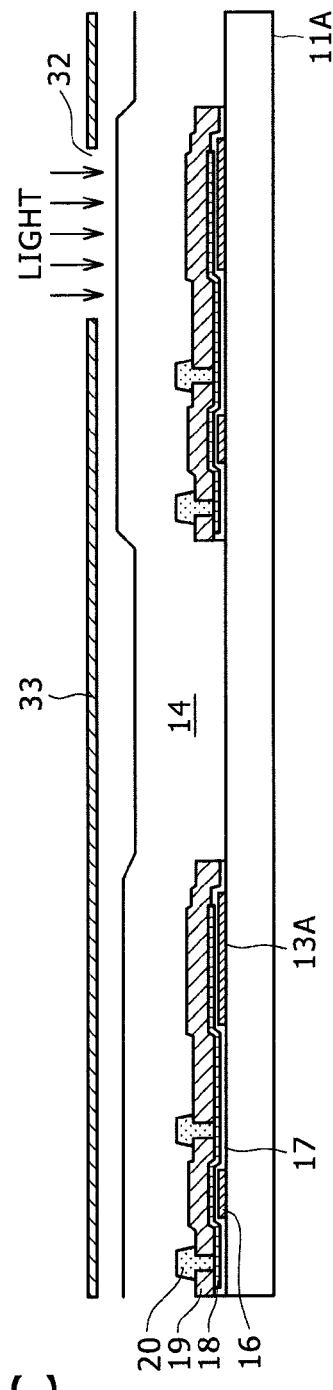
FIG.15A
FIG.15B
FIG.15C

LIQUID CRYSTAL DISPLAY DEVICE AND METHOD OF MANUFACTURING LIQUID CRYSTAL DISPLAY DEVICE

CROSS REFERENCES TO RELATED APPLICATIONS

The present invention contains subject matter related to Japanese Patent Application JP 2007-316539 filed in the Japan Patent Office on Dec. 7, 2007, the entire contents of which being incorporated herein by reference.

BACKGROUND OF THE INVENTION

1. Field of the Invention

The present invention relates to a liquid crystal display device and a method of manufacturing a liquid crystal display device.

2. Description of the Related Art

Liquid crystal display devices generally have a configuration in which two substrates are disposed to face each other with a predetermined gap (spacing) therebetween, and a liquid crystal is fillingly sealed in the gap between the two substrates to form a liquid crystal layer. In the liquid crystal display thus configured, spacers are interposed between the two substrates so as to hold the gap between the two substrates (the thickness of the liquid crystal layer) at a predetermined size. While fine granular (spherical) spacers have been used, spacers in a columnar shape (hereinafter referred to as "columnar spacers") have recently come to be used in place of the granular spacers. The columnar spacers are formed on a substrate by use of a photosensitive resin material such as a photo-resist and, hence, they are referred to also as "photo-spacers."

When a load is exerted on the liquid crystal display device having the columnar spacers in the thickness direction, the substrate and the columnar spacers are deformed under the load. When an excessive load is exerted on a part of the liquid crystal display device, the columnar spacers holding the gap (spacing) between the substrates undergoes plastic deformation at that part. As a result, the gap between the substrates would not return to its initial size even when the load is removed, so that an irregularity in display would be generated.

In recent years, attendant on the reductions in thickness of mobile apparatuses, thinning of glass components in liquid crystal display devices and thinning of the acrylic resin plates or the like covering the surfaces of the liquid crystal display devices have advanced, and there is a tendency toward increased loads being exerted on the liquid crystal display devices. In order to realize a liquid crystal display device with a high pressure resistance under such circumstances, it is effective to enhance the density of the columnar spacers laid out in the substrate surface so as to disperse the pressure exerted on the individual columnar spacers. Specifically, it suffices to increase the area of contact between the substrate and the columnar spacers, either by increasing the number of the columnar spacers laid out per unit area or by enlarging the outer diameter of the individual columnar spacers.

However, the liquid crystal display device generally undergoes a volumetric shrinkage due to a lowering in the density of the liquid crystal under low-temperature environments, so that if the layout density of the columnar spacers is raised by increasing the number of the spacers or by enlarging the spacer outer diameter as above-mentioned, the elastic shrinkage of the columnar spacers may fail to follow up to the volumetric shrinkage of the liquid crystal. Consequently, there may cause a problem on a quality basis in that bubbles are generated in the liquid crystal layer if only a slight impact is exerted on the liquid crystal display device under low-temperature environments. Especially, in mobile use, the liquid crystal display device is frequently exposed to low-temperature environments, and the generation of bubbles would constitute a fatal defect on a quality basis. Therefore, there is a limit to the enhancement of the layout density of the columnar spacers for the purpose of obtaining a higher pressure resistance. In view of this, normally, the retention of quality is given priority over the enhancement of pressure resistance, and the layout density of the columnar spacers is designed to be somewhat low.

In order to solve such a problem, for example, Japanese Patent Laid-open No. 2005-326887 and Japanese Patent Laid-open No. 2002-341354 report a configuration in which two kinds of columnar spacers differing in height are arranged so that the number of the columnar spacers effective in holding the two substrates is varied according to the magnitude of the load (load pressure). In addition, Japanese Patent Laid-open No. 2002-341354 discloses a configuration in which projected stepped parts are formed by stacking layers of substrate-constituting materials, and first columnar spacers are put into contact with the stepped parts, whereby a gap is intermediately provided between second columnar spacers, of which the material and the height are the same as those of the first columnar spacers, and the substrate.

SUMMARY OF THE INVENTION

However, in order to form two kinds of columnar spacers different in height, a step of forming first columnar spacers and a step of forming second columnar spacers different from the first columnar spacers in height have to be carried out separately. This process is accompanied by a large increase in the number of manufacturing steps, leading to a rise in cost. Besides, in the case of forming the columnar spacers by use of a large-sized exposure mask, a modification in the layout density of the columnar spacers or the like, if any, makes it necessary to change the large-sized exposure mask according to the modification, resulting in a considerable increase in cost.

On the other hand, in the case of forming projected stepped parts from substrate-constituting materials, the substrate-constituting materials are stacked on portions which are originally step-free. Therefore, in the case of forming the stepped parts by patterning a laminate layer of an electrode material, a wiring material and an insulating material as disclosed in Japanese Patent Laid-open No. 2002-341354, the stepped parts have to be provided while avoiding the positional interference with the electrode parts, wiring parts, insulating parts, etc. constituting pixel circuits in the liquid crystal display device. Accordingly, the degree of freedom of layout in providing the stepped parts is low.

Thus, there is a need to realize a highly pressure-resistant liquid crystal display device in which generation of bubbles under low-temperature environments can be prevented, without spoiling the degree of freedom of layout.

According to an embodiment of the present invention there is provided a liquid crystal display device including:

a liquid crystal layer;

a first substrate and a second substrate which face each other through the liquid crystal layer therebetween; and a plurality of columnar spacers holding a gap between the first substrate and the second substrate, wherein the plurality of columnar spacers include a first columnar spacer and a second columnar spacer which are formed to be substantially equal in height, and a substrate surface of one of the first substrate and the second substrate is provided with a recess in at least one of a part where to dispose the first columnar spacer and a part where to dispose the second columnar spacer.

According to another embodiment of the present invention there is provided a method of manufacturing a liquid crystal display device including, a liquid crystal layer; a first substrate and a second substrate which face each other through the liquid crystal layer therebetween; and a plurality of columnar spacers holding a gap between the first substrate and the second substrate, wherein the plurality of columnar spacers including a first columnar spacer and a second columnar spacer which are formed to be substantially equal in height, a substrate surface of one of the first substrate and the second substrate being provided with a recess in at least one of a part where to dispose the first columnar spacer and a part where to dispose the second columnar spacer, the one substrate having a driving substrate which includes switching elements for selective driving of pixels, an insulating film covering the switching elements, and a flattening film covering the insulating film, and the recess being formed in a hollowed shape in an upper surface of the flattening film, including:

a first step of applying a photosensitive material onto the driving substrate so as to cover the insulating film, thereby forming the flattening film from the photosensitive material;

a second step of subjecting to an exposure treatment a projected part projected due to wiring and a part where to form the recess, of the flattening film formed in the first step; and a third step of developing the flattening film having undergone the exposure treatment in the second step, whereby the projected part is removed from the flattening film and the recess is formed in the flattening film.

According to yet another embodiment of the present invention there is provided a method of manufacturing a liquid crystal display device including, a liquid crystal layer; a first substrate and a second substrate which face each other through the liquid crystal layer therebetween; and a plurality of columnar spacers holding a gap between the first substrate and the second substrate, wherein the plurality of columnar spacers including a first columnar spacer and a second columnar spacer which are formed to be substantially equal in height, a substrate surface of one of the first substrate and the second substrate being provided with a recess in at least one of a part where to dispose the first columnar spacer and a part where to dispose the second columnar spacer, the one substrate having a driving substrate which includes switching elements for selective driving of pixels, an insulating film covering the switching elements, and a flattening film covering the insulating film, and the recess being formed in a hollowed shape in an upper surface of the flattening film, including:

a first step of applying a photosensitive material onto the driving substrate so as to cover the insulating film, thereby forming the flattening film from the photosensitive material;

a second step of performing sequentially or simultaneously a treatment in which parts, where to form pixel contact connection holes, of the flattening film formed in the first step are exposed to light and a treatment in which a part, where to form the recess, of the flattening film is exposed to light; and a third step of developing the flattening film having undergone the exposure treatment in the second step, whereby the pixel contact connection holes and the recess are formed in the flattening film.

BRIEF DESCRIPTION OF THE DRAWINGS

FIG. 13 is a sectional view showing the condition where a load in excess of a predetermined value is exerted on the liquid crystal display device shown in FIG. 11;

FIGS. 14A to 14C are illustrations of a first method of manufacturing a liquid crystal display device according to one embodiment of the invention;

FIGS. 15A to 15C are illustrations (No. 1) of a second method of manufacturing a liquid crystal display device according to one embodiment of the invention.

DETAILED DESCRIPTION OF THE PREFERRED EMBODIMENTS

Figure 1:
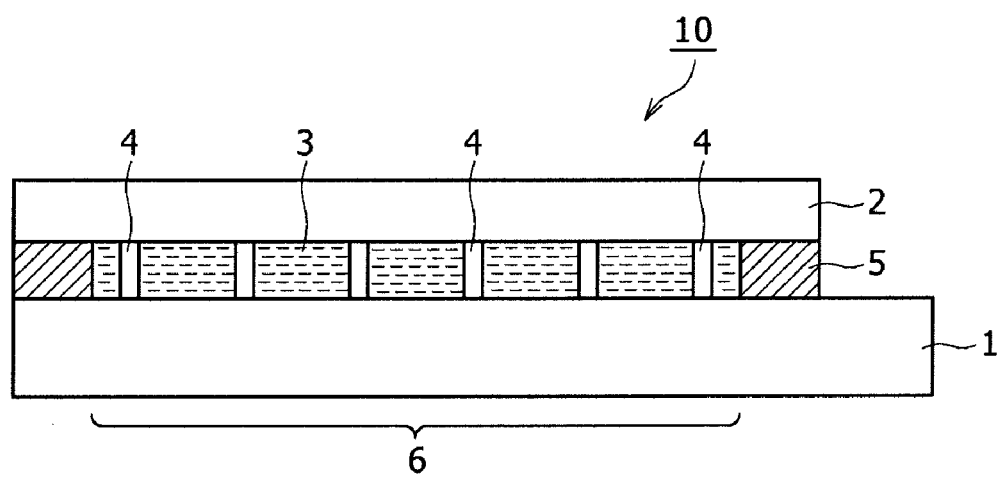
FIG. 1 is a schematic sectional view showing a configuration example of a liquid crystal display device to which embodiments of the present invention is applied.

Now, specific embodiments of the present invention will be described in detail below, referring to the drawings. Incidentally, the technical scope of the invention is not limited to the embodiments described below but includes various modifications and improvements insofar as they fall within the scope in which the specific effects obtained according to the configuration requirements of the invention and combinations thereof can be derived.

FIG. 1 is a schematic sectional view showing a configuration example of a liquid crystal display device to which embodiments of the present invention is applied. The liquid crystal display device 10 shown in FIG. 1 generally includes a first substrate 1, a second substrate 2, a liquid crystal layer 3, a plurality of columnar spacers 4, and a sealing part 5. The first substrate 1 and the second substrate 2 each includes a light-transmitting substrate. The plan-view size of the first substrate 1 is set to be larger than that of the second substrate 2. The first substrate 1 and the second substrate 2 are disposed in the state of facing each other, with the liquid crystal layer 3 therebetween in a display region 6. The liquid crystal layer 3 is formed by fillingly pouring a liquid crystal into the space (gap) between the first substrate 1 and the second substrate 2. The liquid crystal layer 3 is operative to selectively transmit display light between the first substrate 1 and the second substrate 2. The quantity of light transmitted through the liquid crystal layer 3 is controlled on a unit pixel basis by pixel circuits (not shown). The unit pixel constitutes a minimum unit of pixel for controlling the quantity of light transmitted, in the liquid crystal layer 3.

The columnar spacers 4 function to hold the gap (spacing) between the first substrate 1 and the second substrate 2. The columnar spacers 4 are disposed in plurality in the state of being dispersed in the display region 6. In the embodiments of the present embodiment, the plurality of columnar spacers 4 are classified into "first columnar spacers" and "second columnar spacers." The sealing part 5 is formed in a tetragonal frame-like shape in the state of surrounding the display region 6. The sealing part 5 includes a sealing material used to bond the first substrate 1 and the second substrate 2 to each other. The liquid crystal display device 10 has, for example, a configuration in which back-light light incident thereon from the side of the first substrate 1 is transmitted therethrough to go out on the side of the second substrate 2.

First Embodiment

Figure 2:
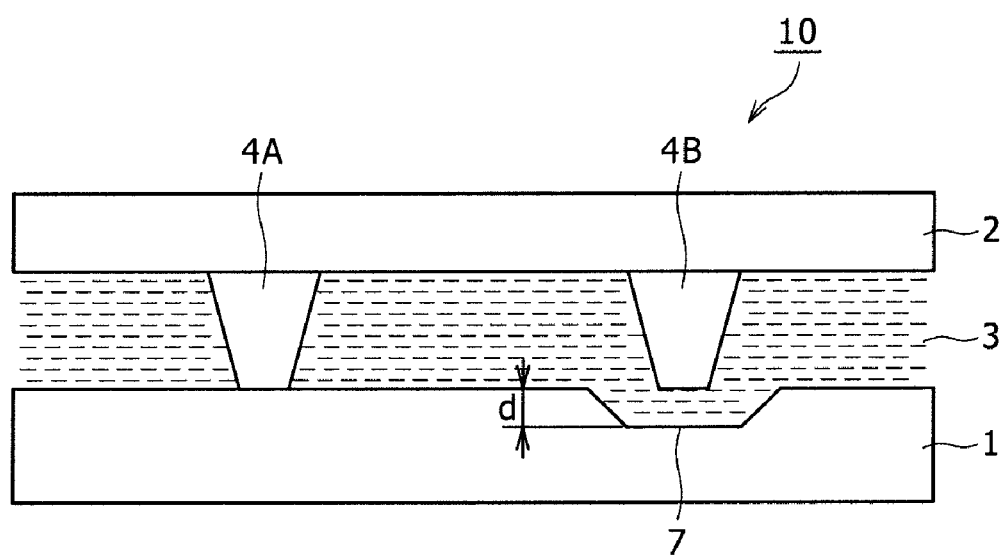
FIG. 2 is an essential part enlarged sectional view showing the configuration of a liquid crystal display device according to a first embodiment of the invention.

FIG. 2 is an essential part enlarged sectional view showing the configuration of a liquid crystal display device according to a first embodiment of the present invention. In FIG. 2, a first columnar spacer 4A and a second columnar spacer 4B are formed on the second substrate 2 in the state of making intimate contact with the second substrate 2. The first columnar spacer 4A and the second columnar spacer 4B are formed in a columnar shape so as to be substantially equal in height. In addition, the columnar spacers 4A, 4B are each formed in a frusto-conical shape of which the outer diameter at a base end part is greater than the outer diameter at a tip part.

Of a substrate surface of the second substrate 2, the part where the first columnar spacer 4A is disposed and the part where the second columnar spacer 4B is disposed constitute a stepless flat surface. On the other hand, of a substrate surface of the first substrate 1, a part where the first columnar spacer 4A is disposed is a flat surface, whereas a part where the second columnar spacer 4B is disposed is hollowed, and the thus hollowed part constitutes a recess 7. The recess 7 is formed to be circular in plan-view shape.

In addition, the base end part of the first columnar spacer 4A is in contact with the inside surface of the second substrate 2, and the tip part of the first columnar spacer 4A is in contact with the inside surface of the first substrate 1. On the other hand, the base end part of the second columnar spacer 4B is in contact with the inside surface of the second substrate 2, but the tip part of the second columnar spacer 4B is out of contact with (or is separate from) the inside surface of the first substrate 1 due to the presence of the recess 7. The inside surface of the first substrate 1 herein means that surface of the first substrate 1 which faces the second substrate 2, and the inside surface of the second substrate 2 herein means that surface of the second substrate 2 which faces the first substrate 1.

The recess size d of the recess 7, with reference to that part (surface) of the substrate surface of the first substrate 1 at which the first columnar spacer 4A is disposed, is set in the range of, for example, d=0.1 to 1.5 µm, preferably d=0.1 to 0.5 µm in order that the first columnar spacer 4A would not undergo plastic deformation even when a load is exerted thereon. This ensures that, in the condition where no load is exerted on the liquid crystal display device 10 in the thickness direction (the case where the load is zero), a gap (spacing) corresponding to the size d is intermediately provided between the tip part of the second columnar spacer 4B and the bottom surface of the recess 7 in the first substrate 1. The bottom surface of the recess 7 is formed to have a diameter larger than the outer diameter of the second columnar spacer 4B. For example, where the diameter of the second columnar spacer 4B is set at Ds µm and the tolerance of positional stagger (misregistration) at the time of adhesion of the first substrate 1 and the second substrate 2 to each other is set at ±α µm, the diameter of the circular bottom surface of the recess 7 is set at "Ds+2α."

Figure 3:
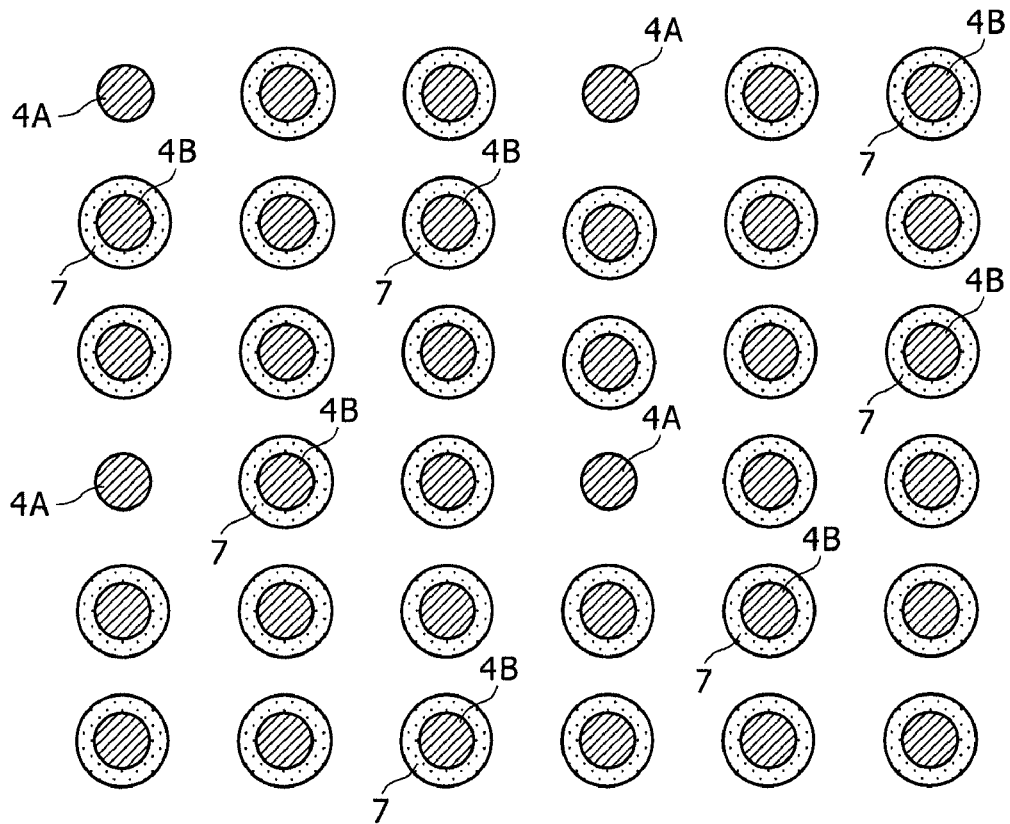
FIG. 3 illustrates a plan-view layout example of columnar spacers and recesses.

Besides, taking the liquid crystal display device 10 as a whole, the first columnar spacers 4A are laid out in the state of being evenly dispersed throughout the display region 6, and the second columnar spacers 4B are also laid out in the state of being evenly dispersed throughout the display region 6. FIG. 3 illustrates a plan-view layout example of the columnar spacers and the recesses. In this layout example, of the plurality of columnar spacers 4 (4A, 4B) arranged in a matrix pattern, the first columnar spacers 4A are arranged two pieces apart in the row direction and in the column direction, and two second columnar spacers 4B and two recesses 7 are so arranged as to fill each of the blanks between the first columnar spacers 4A. Consequently, eight second columnar spacers 4B and eight recesses 7 are arranged in each 3×3 matrix including one first columnar spacer 4A.

Here, the area of the display region 6 of the liquid crystal display device 10 (display area) is defined as "S1," the layout area of all the columnar spacers 4 laid out between the first substrate 1 and the second substrate 2 [(the sectional area of the columnar spacer 4)×(the total number of the columnar spacers 4)] is defined as "S2," the layout area of the first columnar spacers 4A of all the columnar spacers 4 [(the sectional area of the first columnar spacer 4A)×(the number of the first columnar spacers 4A)] is defined as "S3," and the layout area of the second columnar spacers 4B of all the columnar spacers 4 [(the sectional area of the second columnar spacer 4B)×(the number of the second columnar spacers 4B)] is defined as "S4." Then, the layout density D0 of all the columnar spacers 4 in the display region 6 is represented by the following formula (1), the layout density D1 of the first columnar spacers 4A in the display region 6 is represented by the following formula (2), and the layout density D2 of the second columnar spacers 4B in the display region 6 is represented by the following formula (3).

$$D0 = S2 \div S1 \tag{1}$$

$$D1 = S3 \div S1 \tag{2}$$

$$D2 = S4 \div S1 \tag{3}$$

It is desirable to set the layout density D1 of the first columnar spacers 4A in the condition of "0.1<D1<0.3," mainly from the viewpoint of favorably maintaining the follow-up property of elastic shrinkage of the columnar spacers 4 in response to the volumetric shrinkage of the liquid crystal layer 3 attendant on a lowering in the density of the liquid crystal under low-temperature environments. On the other hand, it is desirable to set the layout density D2 of the second columnar spacers 4B to be equal to or higher than the layout density D1 of the first columnar spacers 4A, namely, "D2≧D1" (preferably, "D2≧2×D1"), from the viewpoint of enhancing the pressure resistance of the liquid crystal display device 10 to loads.

In the liquid crystal display device 10 configured as above, in the case where the load is not more than a predetermined value (inclusive of the case where the load is zero), the tip parts of the first columnar spacers 4A are disposed in contact with the first substrate 1, whereas the tip parts of the second columnar spacers 4B formed on the second substrate 2 so as to face the recesses in the first substrate 1 are disposed in the state of being out of contact with (or separate from) the first substrate 1. Therefore, the gap (spacing) between the first substrate 1 and the second substrate 2 is held by only the first columnar spacers 4A. Accordingly, when a load of not more than the predetermined value is exerted, the effective layout density of the columnar spacers 4 supporting the first substrate 1 and the second substrate 2 depends on the layout density D1 of the first columnar spacers 4A.

On the other hand, when the load exceeds the predetermined value, the tip parts of the second columnar spacers 4B are brought into contact with the bottom surfaces of the recesses 7 in the first substrate 1 due to the deformation of the second substrate 2 attendant on the application of the load, while the tip parts of the first columnar spacers 4A are kept in contact with the first substrate 1. Therefore, the gap (spacing) between the first substrate 1 and the second substrate 2 is held by both the first columnar spacers 4A and the second columnar spacers 4B. Accordingly, when a load exceeding the predetermined value is exerted, the effective layout density of the columnar spacers 4 supporting the first substrate 1 and the second substrate 2 depends on the layout density D0 (=D1+D2) of all the columnar spacers 4.

Consequently, for example, in the case where no load is exerted on the liquid crystal display device 10, the effective layout density of the columnar spacers 4 is suppressed to a low level, so that even if a volumetric shrinkage is generated due to a lowering in the density of the liquid crystal under low-temperature environments, the elastic shrinkage of the columnar spacers 4 (the first columnar spacers 4A) can follow up to the volumetric shrinkage. Besides, in the case where an excessive load in excess of the predetermined value is exerted on the liquid crystal display device 10, the effective layout density of the columnar spacers 4 can be increased only in that case. Accordingly, it is possible to realize a highly pressure-resistant liquid crystal display device in which generation of bubbles under low-temperature environments can be effectively prevented.

Second Embodiment

Figure 4:
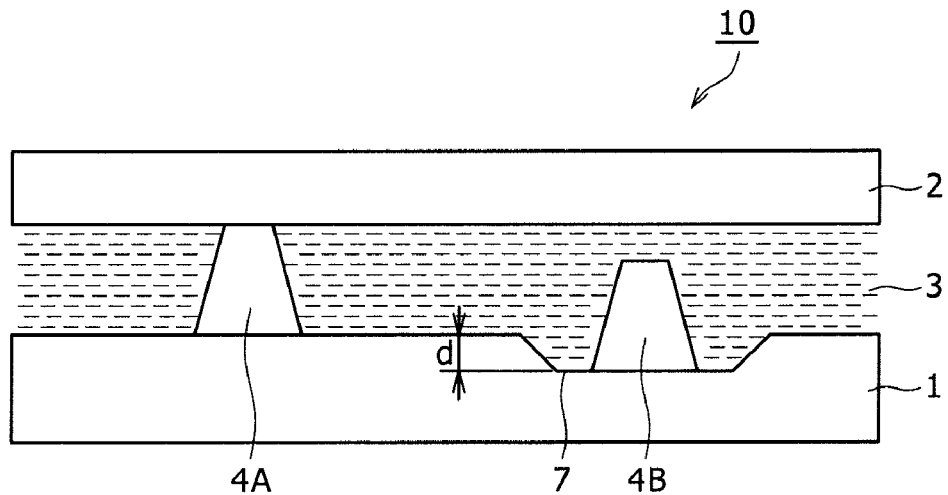
FIG. 4 is an essential part enlarged sectional view showing the configuration of a liquid crystal display device according to a second embodiment of the invention.

FIG. 4 is an essential part enlarged sectional view showing the configuration of a liquid crystal display device according to a second embodiment of the present invention. In FIG. 4, a first columnar spacer 4A and a second columnar spacer 4B are formed on a first substrate 1 in the state of making contact with the first substrate 1. The first columnar spacer 4A and the second columnar spacer 4B are formed to be substantially equal in height. In addition, the columnar spacers 4A, 4B are each formed in a frusto-conical shape of which the outer diameter at a base end part is larger than that at a tip part.

Of a substrate surface of the second substrate 2, the part where the first columnar spacer 4A is disposed and the part where the second columnar spacer 4B is disposed constitute a stepless flat surface. On the other hand, of a substrate surface of the first substrate 1, the part where the first columnar spacer 4A is disposed is a flat surface, whereas the part where the second columnar spacer 4B is disposed is hollowed, and the thus hollowed part constitutes a recess 7. Besides, the second columnar spacer 4B is formed on the first substrate 1 in the recess 7. The recess 7 is formed to be circular in plan-view shape.

In addition, the base end part of the first columnar spacer 4A is in contact with the inside surface of the first substrate 1, and the tip part of the first columnar spacer 4A is in contact with the inside surface of the first substrate 2. On the other hand, the base end part of the second columnar spacer 4B is in contact with the bottom surface of the recess 7 in the first substrate 1, and the tip part of the second columnar spacer 4B is out of contact with (or is separate from) the inside surface of the second substrate 2 due to the presence of the recess 7.

The recess size d of the recess 7, with reference to that part (surface) of the substrate surface of the first substrate 1 at which the first columnar spacer 4A is disposed, is set in the range of, for example, d=0.1 to 1.5 μm, preferably d=0.1 to 0.5 μm in order that the first columnar spacer 4A would not undergo plastic deformation even when a load is exerted thereon. This ensures that, in the condition where no load is exerted on the liquid crystal display device 10 in the thickness direction (the case where the load is zero), a gap (spacing) corresponding to the size d is intermediately provided between the tip part of the second columnar spacer 4B and the inside surface of the second substrate 2. The bottom surface of the recess 7 is formed to have a diameter larger than the outer diameter (the outer diameter of the base end part) of the second columnar spacer 4B. In addition, taking the liquid crystal display device 10 as a whole, the first columnar spacers 4A are disposed in the state of being evenly dispersed throughout the display region 6, and the second columnar spacers 4B are also disposed in the state of being evenly dispersed throughout the display region 6.

The layout density D1 of the first columnar spacers 4A and the layout density D2 of the second columnar spacers 4B as above-mentioned are desirably set in the same conditions as in the first embodiment described above. Specifically, the layout density D1 of the first columnar spacers 4A is desirably set in the condition of "0.1<D1<0.3," and the layout density D2 of the second columnar spacers 4B is desirably set in the condition of "D2≧D1" (preferably, in the condition of "D2≧2×D1").

In the liquid crystal display device 10 configured as above, in the case where the load is not more than a predetermined value (inclusive of the case where the load is zero), the tip parts of the first columnar spacers 4A are disposed in contact with the second substrate 2, whereas the tip parts of the second columnar spacers 4B formed on the first substrate 1 in the recesses 7 are disposed in the state of being out of contact with (or separate from) the second substrate 2. Therefore, the gap (spacing) between the first substrate 1 and the second substrate 2 is held by only the first columnar spacers 4A. Accordingly, when a load of not more than the predetermined value is exerted, the effective layout density of the columnar spacers 4 supporting the first substrate 1 and the second substrate 2 depends on the layout density D1 of the first columnar spacers 4A.

On the other hand, when the load exceeds the predetermined value, the tip parts of the second columnar spacers 4B are brought into contact with the inside surface of the second substrate 2 due to the deformation of the second substrate 2 attendant on the application of the load, while the tip parts of the first columnar spacers 4A are kept in contact with the second substrate 2. Therefore, the gap (spacing) between the first substrate 1 and the second substrate 2 is held by both the first columnar spacers 4A and the second columnar spacers 4B. Accordingly, when a load exceeding the predetermined value is exerted, the effective layout density of the columnar spacers 4 supporting the first substrate 1 and the second substrate 2 depends on the layout density D0 (=D1+D2) of all the columnar spacers 4.

Consequently, for example, in the case where no load is exerted on the liquid crystal display device 10, the effective layout density of the columnar spacers 4 is suppressed to a low level, so that even if a volumetric shrinkage is generated due to a lowering in the density of the liquid crystal under low-temperature environments, the elastic shrinkage of the columnar spacers 4 (the first columnar spacers 4A) can follow up to the volumetric shrinkage. Besides, in the case where an excessive load in excess of the predetermined value is exerted on the liquid crystal display device 10, the effective layout density of the columnar spacers 4 can be increased only in that case. Accordingly, it is possible to realize a highly pressure-resistant liquid crystal display device in which generation of bubbles under low-temperature environments can be effectively prevented.

Furthermore, the configuration in which the columnar spacers 14 are formed on the first substrate 1 provided with the recesses 7 makes it unnecessary to take into account the positional stagger (misregistration) which may occur in adhesion of the first substrate 1 and the second substrate 2 to each other, at the time of setting the size of the recesses 7. Therefore, the formation region of the recesses 7 can be reduced, as compared with the case of forming the recesses 7 and the columnar spacers 4 on the sides of the different substrates as in the first embodiment described above. Accordingly, it is possible to set smaller a light shielding area for suppressing leakage of light due to irregularities in liquid crystal orientation in the periphery of the columnar spacer 4, and it is possible to realize a liquid crystal display device having a higher transmittance than that in the first embodiment.

Figure 5:
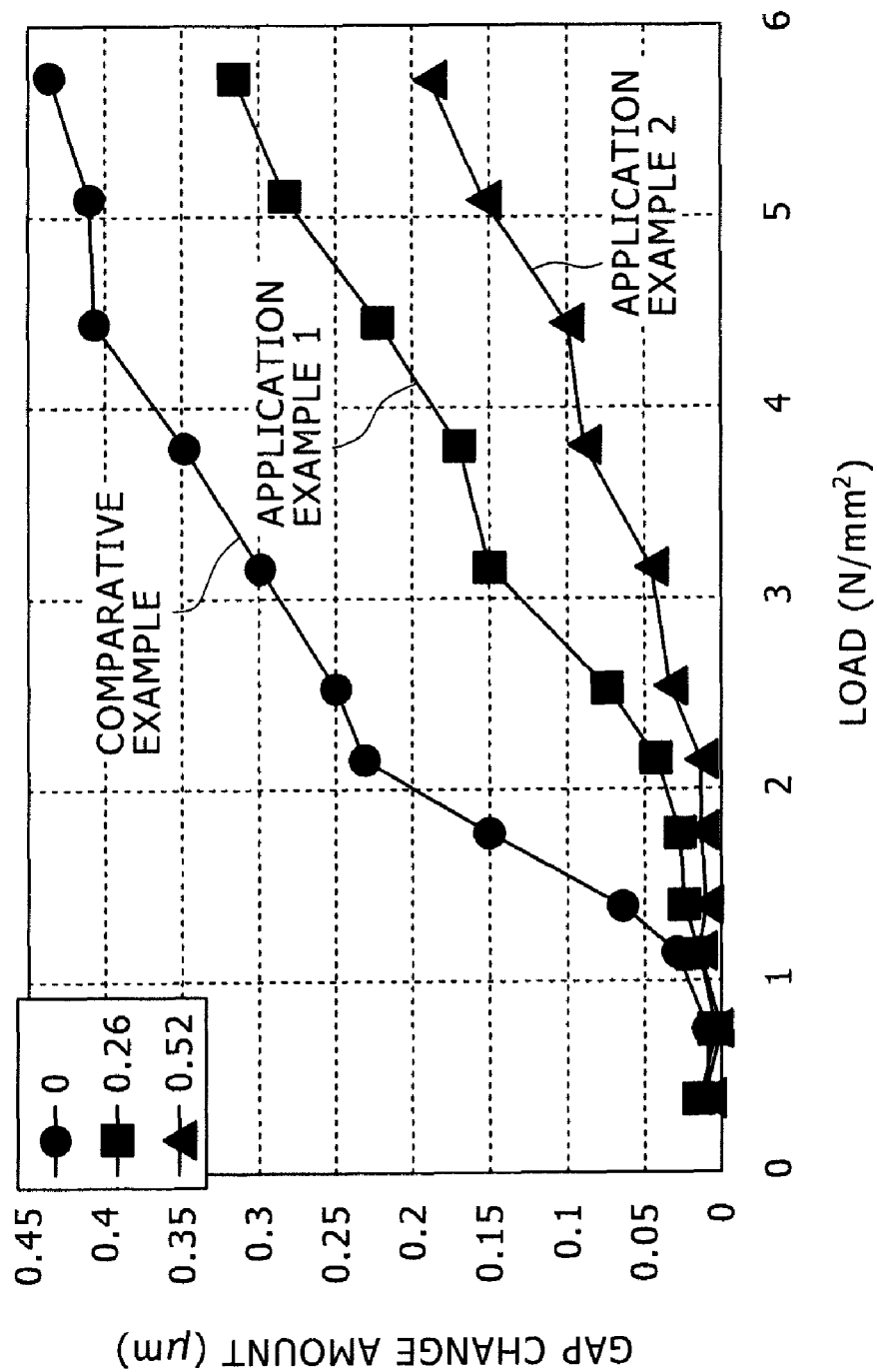
FIG. 5 is a diagram in which experimentally determined relations between gap change amount and load are represented by graphs.

FIG. 5 is a diagram in which experimentally determined relations between gap change amount and load are represented by graphs. The gap change amount ($\mu$m) taken on the axis of ordinates represents the change in the gap (spacing) between the first substrate 1 and the second substrate 2, whereas the load (N/mm$^2$) taken on the axis of abscissas represents the load exerted on the liquid crystal display device 10 in the thickness direction. In the experiments, a configuration in which only first columnar spacers 4A are interposed between a first substrate 1 and a second substrate with layout densities of D1=0.26 and D2=0 is adopted as Comparative Example in relation to the present invention. Besides, in the experiments, a configuration in which recesses 7 are formed in a substrate surface of a first substrate 1 in the condition of the size d=0.2 $\mu$m and in which both first columnar spacers 4A and second columnar spacers 4B are interposed between the first substrate 1 and a second substrate 2 with layout densities of D1=0.26 and D2=0.26 is adopted as Application Example 1 of the present invention. Further, in the experiments, a configuration in which both first columnar spacers 4A and second columnar spacers 4B are interposed between a first substrate 1 and a second substrate 2 with layout densities of D1=0.26 and D2=0.52 is adopted as Application Example 2 of the present invention. Therefore, in the configuration of Comparative Example, the effective layout density of the columnar spacers 4 is constantly 0.26. On the other hand, in the configuration of Application Example 1, the effective layout density of the columnar spacers 4 increases from 0.26 to 0.52 in the course of an increase in load. Further, in the configuration of Application Example 2, the effective layout density of the columnar spacers 4 increases from 0.26 to 0.78 in the course of an increase in load.

As seen from FIG. 5, in the configuration of Comparative Example in which only the first columnar spacers 4A are interposed between the first substrate 1 and the second substrate 2, the gap change amount increases rapidly from around a point where the load exerted on the liquid crystal display device 10 exceeds 1 N/mm$^2$, and the gap change amount reaches 0.2 $\mu$m at the stage where the load is a little more than 2 N/mm$^2$. Then, the gap change amount increases from 0.28 $\mu$m through 0.36 $\mu$m to 0.41 $\mu$m as the load increases from 3 N/mm$^2$ through 4 N/mm$^2$ to 5 N/mm$^2$, and the maximum of the gap change amount is about 0.43 $\mu$m.

On the other hand, in the configuration of Application Example 1 in which the layout density D1 of the first columnar spacer 4A and the layout density D2 of the second columnar spacer 4B are equalized at 0.26, the gap change amount is suppressed to below 0.05 $\mu$m even at the state where the load is a little more than 2 N/mm$^2$, and the gap change amount increases gradually from around the instant that the load exceeds 2.5 N/mm$^2$. It is to be noted here that at the stage where the load is 5 N/mm$^2$, the gap change amount is suppressed to about 0.27 $\mu$m, which is equivalent to about 70% based on that in Comparative Example, and the maximum of the gap change amount is about 0.32 $\mu$m.

Furthermore, in the configuration of Application Example 2 in which the layout density D2 of the second columnar spacers 4B is set to be twice the layout density D1 of the first columnar spacers 4A, the gap change amount increases gradually from around the stage where the load exceeds 2.5 N/mm$^2$, in the same manner as in Application Example 1, but the gap change amount is suppressed to about 0.05 $\mu$m even at the stage where the load is a little more than 3 N/mm$^2$. Besides, at the stage where the load is 5 N/mm$^2$, the gap change amount is suppressed to about 0.15 $\mu$m, which is equivalent to about 40% based on that in Comparative Example, and the maximum of the gap change amount is about 0.18 $\mu$m.

From the above-mentioned experimental results, also, it has been verified that an increase in the effective layout density of the columnar spacers 4 between the first substrate 1 and the second substrate 2 contributes greatly on enhancement of the pressure resistance of the liquid crystal display device 10. In addition, though not shown in the drawings, whether or not bubbles would be generated upon an impact under low-temperature environments was checked for each of the case where only the first columnar spacers 4A were interposed in a layout density D1=0.26 between the first substrate 1 and the second substrate 2, the case where only the first columnar spacers 4A were interposed in a layout density D1=0.52 between the first substrate 1 and the second substrate 2, and the case where only the first columnar spacers 4A were interposed in a layout density D1=0.78 between the first substrate 1 and the second substrate 2. As a result, it was found that generation of bubbles was "present" in the cases where the layout density of the first columnar spacers 4A was set to D1=0.52 and D1=0.78, respectively, whereas generation of bubbles was "absent" in the case where the layout density of the first columnar spacers 4A was set to D1=0.26.

First Specific Example

Figure 6:
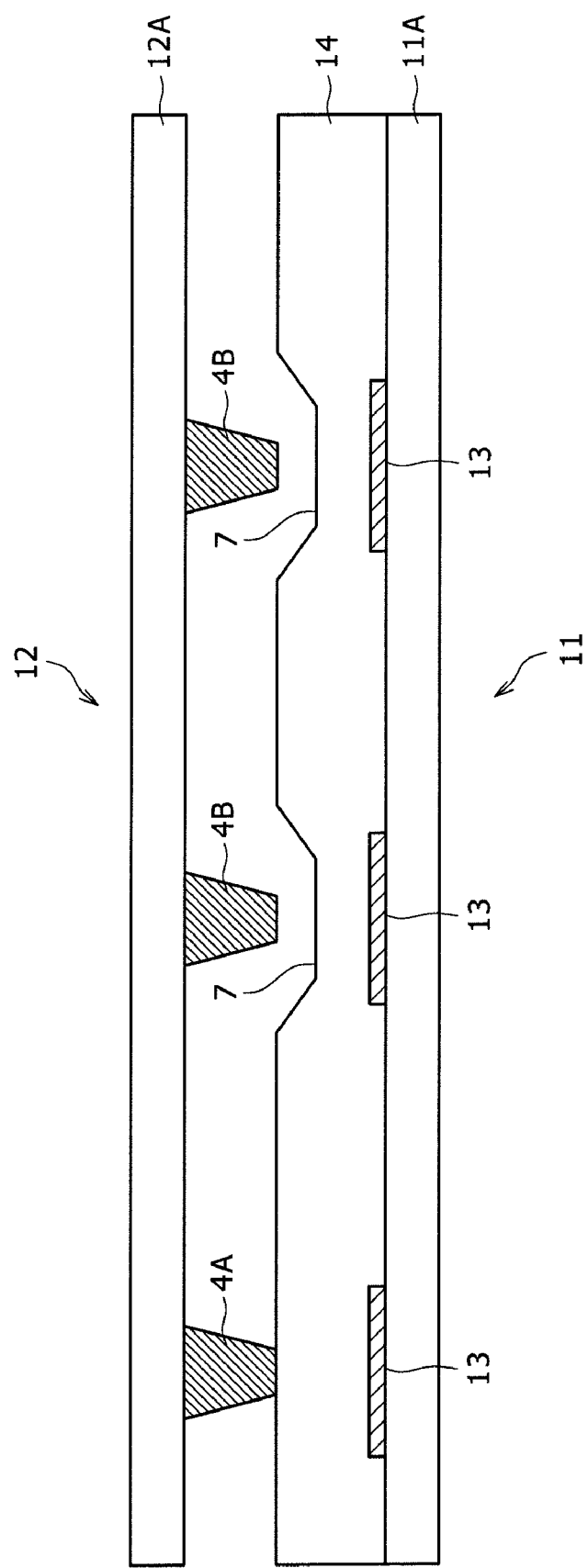
FIG. 6 is a schematic sectional view showing a first specific example of the liquid crystal display device in which a first substrate is a driving substrate and a second substrate is an opposite substrate.

FIG. 6 is a schematic sectional view showing a first specific example of the liquid crystal display device in which a first substrate is a driving substrate and a second substrate is an opposite substrate. The driving substrate 11 constituting the first substrate is based on a transparent glass substrate 11A, and the opposite substrate 12 constituting the second substrate is also based on a transparent glass substrate 12A. First columnar spacers 4A and second columnar spacers 4B are formed on the opposite substrate 12 in the state of making intimate contact with the opposite substrate 12. Incidentally, in FIG. 6, a liquid crystal layer 3 is omitted.

The driving substrate 11 is provided with light shielding films 13 formed, for example, of a metal, correspondingly to the portions where the columnar spacers 4 are disposed. Display light (back-light light or the like) incident from the outside (back side) of the driving substrate 11 is shielded by the light shielding films 13 when transmitted through the driving substrate 11. Therefore, leakage of light due to irregularities in liquid crystal orientation in the peripheries of the columnar spacers 4 can be restrained. In addition, a flattening film 14 formed, for example, of an insulating organic material (organic resin material) is provided on the driving substrate 11 in the state of covering the light shielding films 13. The flattening film 14 is formed for flattening the steps generated due to the presence of the light shielding films 13 and switching elements (not shown) which are formed on the upper surface of the driving substrate 11.

A substrate surface of the driving substrate 11 is provided with recesses 7 at parts where the second columnar spacers 4B are disposed. The recesses 7 are formed in the upper surface of the flattening film 14 in a hollowed form. Therefore, a gap corresponding to the recess size of the recesses 7 is secured between the tip parts of the second columnar spacers 4B and the bottom surfaces of the recesses 7. Accordingly, when the innermost surface of the driving substrate 11 is presumed to be the upper surface of the flattening film 14, tip parts of the second columnar spacers 4B are disposed to be out of contact with (or separate from) the flattening film 14, whereas tip parts of the first columnar spacers 4A are disposed in contact with the flattening film 14.

On the other hand, the opposite substrate 12 is formed with a color filter layer (not shown), for example. The color filter layer functions to selectively transmit light in a specified wavelength region, of the light transmitted through the driving substrate 11 and through the liquid crystal layer 3 to reach the opposite substrate 12. For example, a red color filter selectively transmits light in a red wavelength region, a green color filter selectively transmits light in a green wavelength region, and a blue color filter selectively transmits light in a blue wavelength region.

In the liquid crystal display device 10 configured as above, in the case where the load is not more than a predetermined value (inclusive of the case where the load is zero), the tip parts of the first columnar spacers 4A are disposed in the state of making contact with the flattening film 14 of the driving substrate 11, whereas the tip parts of the second columnar spacers 4B formed on the opposite substrate 12 so as to face the recesses 7 in the driving substrate 11 are disposed in the state of being out of contact with (or separate from) the flattening film 14 of the driving substrate 11. Therefore, the gap (spacing) between the driving substrate 11 and the opposite substrate 12 is held by only the first columnar spacers 4A. Accordingly, in the case where a load of not more than a predetermined value is exerted, the effective layout density of the columnar spacers 4 supporting the driving substrate 11 and the opposite substrate 12 depends on the layout density of the first columnar spacers 4A.

Figure 7:
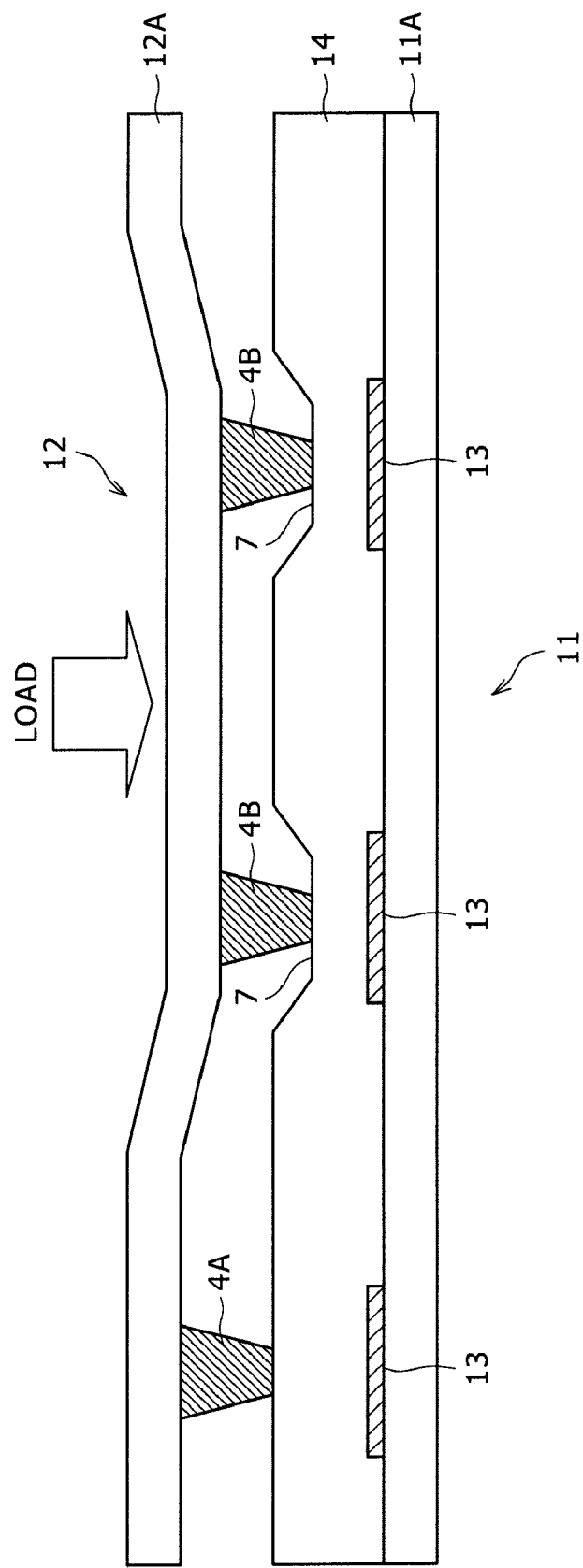
FIG. 7 is a sectional view showing the condition where a load in excess of a predetermined value is exerted on the liquid crystal display device shown in FIG. 6.

On the other hand, in the case where the load exceeds the predetermined value, as shown in FIG. 7, the tip parts of the second columnar spacers 4B are brought into contact with the bottom surfaces of the recesses 7 in the flattening film 14 due to deformation of the opposite substrate 12 attendant on the application of the load, while the tip parts of the first columnar spacers 4A are kept in contact with the flattening film 14. Therefore, the gap (spacing) between the driving substrate 11 and the opposite substrate 12 is held by both the first columnar spacers 4A and the second columnar spacers 4B. Accordingly, in the case where a load in excess of the predetermined value is exerted, the effective layout density of the columnar spacers 4 supporting the driving substrate 11 and the opposite substrate 12 depends on the layout density of all the columnar spacers 4.

This ensures that, for example, in the case where no load is exerted on the liquid crystal display device 10, even when a volumetric shrinkage is generated due to a lowering in the density of the liquid crystal under low-temperature environments, the elastic shrinkage of the columnar spacers 4 (the first columnar spacers 4A) can follow up to the volumetric shrinkage, since the effective layout density of the columnar spacers 4 is suppressed to a low level. Besides, in the case where an excessive load in excess of the predetermined value is exerted on the liquid crystal display device 10, the effective layout density of the columnar spacers 4 can be increased only in that case. Accordingly, it is possible to realize a highly pressure-resistant liquid crystal display device 10 in which generation of bubbles under low-temperature environments can be prevented.

Besides, in providing the driving substrate 11 with the recesses 7, the upper surface of the flattening film 14 is locally hollowed correspondingly to the parts where the second columnar spacers 4B are disposed at the time of adhesion of the driving substrate 11 and the opposite substrate 12 to each other, whereby the thus hollowed recesses 7 are formed in the upper surface of the flattening film 14. Since the flattening film 14 is formed as a thick film for the purpose of flattening literally, even when the upper surface is locally hollowed, for example, by about 1.5 μm, it does not produce any problem on the basis of the function of the liquid crystal display device 10. In addition, the flattening film 14 on the driving substrate 11 forms a component which is indispensable as an under film for forming transparent electrodes (described later) in a flat form. Therefore, in forming the recesses 7 by hollowing some parts (the parts where to dispose the second columnar spacers 4B) of the flattening film 14 that is originally present as a component of the liquid crystal display device 10, positional interference with, for example, electrode parts, wiring parts and insulating parts which constitute pixel circuits would not occur. Accordingly, the degree of freedom of layout in the case of providing the driving substrate 11 with the recesses 7 is high.

Second Specific Example

Figure 8:
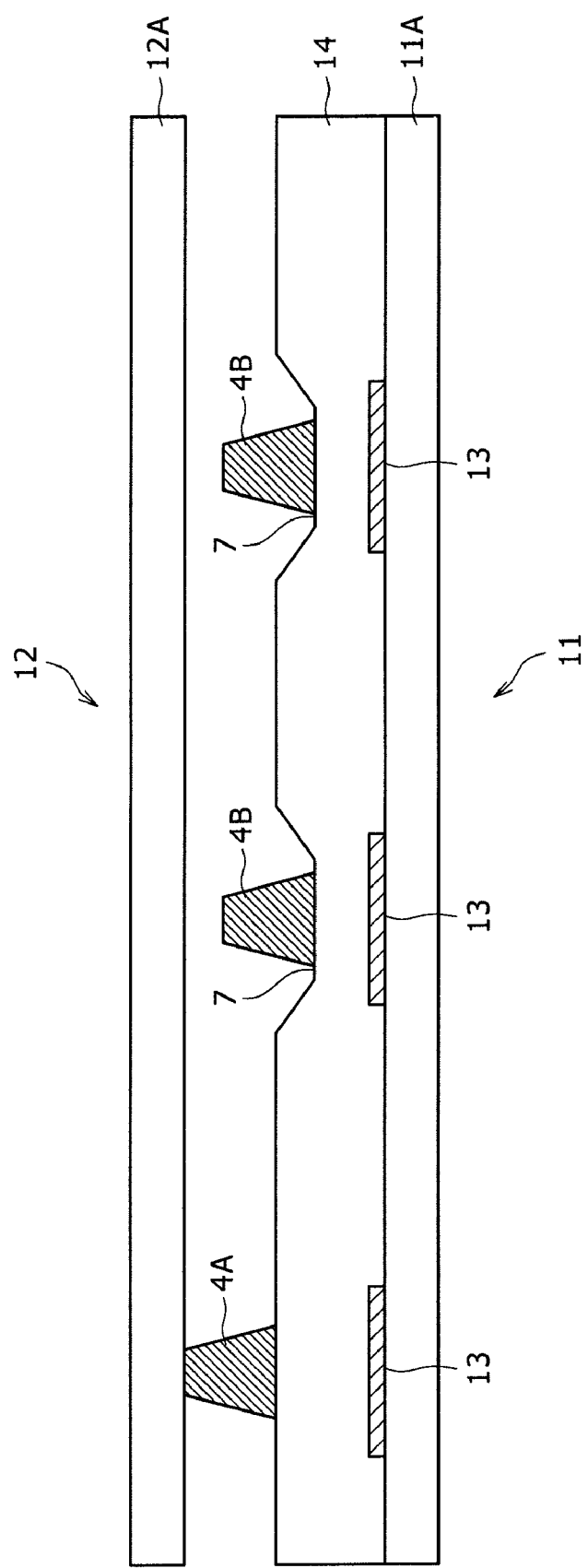
FIG. 8 is a schematic sectional view showing a second specific embodiment of the liquid crystal display device in which the first substrate is a driving substrate and the second substrate is an opposite substrate.

FIG. 8 is a schematic sectional view showing a second specific example of the liquid crystal display device in which a first substrate is a driving substrate and a second substrate is an opposite substrate. The driving substrate 11 constituting the first substrate is based on a transparent glass substrate 11A, and the opposite substrate 12 constituting the second substrate is also based on a transparent glass substrate 12A. First columnar spacers 4A and second columnar spacers 4B are formed on the first substrate 11 in the state of making intimate contact with the first substrate 11. Incidentally, in FIG. 8, a liquid crystal layer 3 is omitted.

The driving substrate 11 is provided with light shielding films 13 formed, for example, of a metal, correspondingly to the portions where the columnar spacers 4 are disposed. Display light (back-light light or the like) incident from the outside (back side) of the driving substrate 11 is shielded by the light shielding films 13 when transmitted through the driving substrate 11. Therefore, leakage of light due to irregularities in liquid crystal orientation in the peripheries of the columnar spacers 4 can be restrained. In addition, a flattening film 14 formed, for example, of an insulating organic material (organic resin material) is provided on the driving substrate 11 in the state of covering the light shielding films 13. The flattening film 14 is formed for flattening the steps generated due to the presence of the light shielding films 13 and switching elements (not shown) which are formed on the upper surface of the driving substrate 11.

A substrate surface of the driving substrate 11 is provided with recesses 7 at parts where the second columnar spacers 4B are disposed. The recesses 7 are formed in the upper surface of the flattening film 14 in a hollowed form. In addition, the second columnar spacers 4B are formed on the driving substrate 11 in the condition where base end parts of the spacers are in intimate contact with the bottom surfaces of the recesses 7 in the flattening film 14. Therefore, a gap corresponding to the recess size of the recesses 7 is secured between the tip parts of the second columnar spacers 4B and the inside surface of the opposite substrate 12. Accordingly, tip parts of the first columnar spacers 4B are disposed in contact with the opposite substrate 12, whereas tip parts of the second columnar spacers 4B are disposed to be out of contact with (or separate from) the inside surface of the opposite substrate 12.

On the other hand, the opposite substrate 12 is provided with a color filter layer (not shown), for example. The color filter layer functions to selectively transmit light in a specified wavelength region, of the light transmitted through the driving substrate 11 and through the liquid crystal layer 3 to reach the opposite substrate 12. For example, a red color filter selectively transmits light in a red wavelength region, a green color filter selectively transmits light in a green wavelength region, and a blue color filter selectively transmits light in a blue wavelength region.

In the liquid crystal display device 10 configured as above, in the case where the load is not more than a predetermined value (inclusive of the case where the load is zero), the tip parts of the first columnar spacers 4A are disposed in the state of making contact with the inside surface of the opposite substrate 12, whereas the tip parts of the second columnar spacers 4B formed on the bottom surfaces of the recesses 7 in the driving substrate 11 are disposed in the state of being out of contact with (or separate from) the inside surface of the opposite substrate 12. Therefore, the gap (spacing) between the driving substrate 11 and the opposite substrate 12 is held by only the first columnar spacers 4A. Accordingly, in the case where a load of not more than a predetermined value is exerted, the effective layout density of the columnar spacers 4 supporting the driving substrate 11 and the opposite substrate 12 depends on the layout density of the first columnar spacers 4A.

Figure 9:
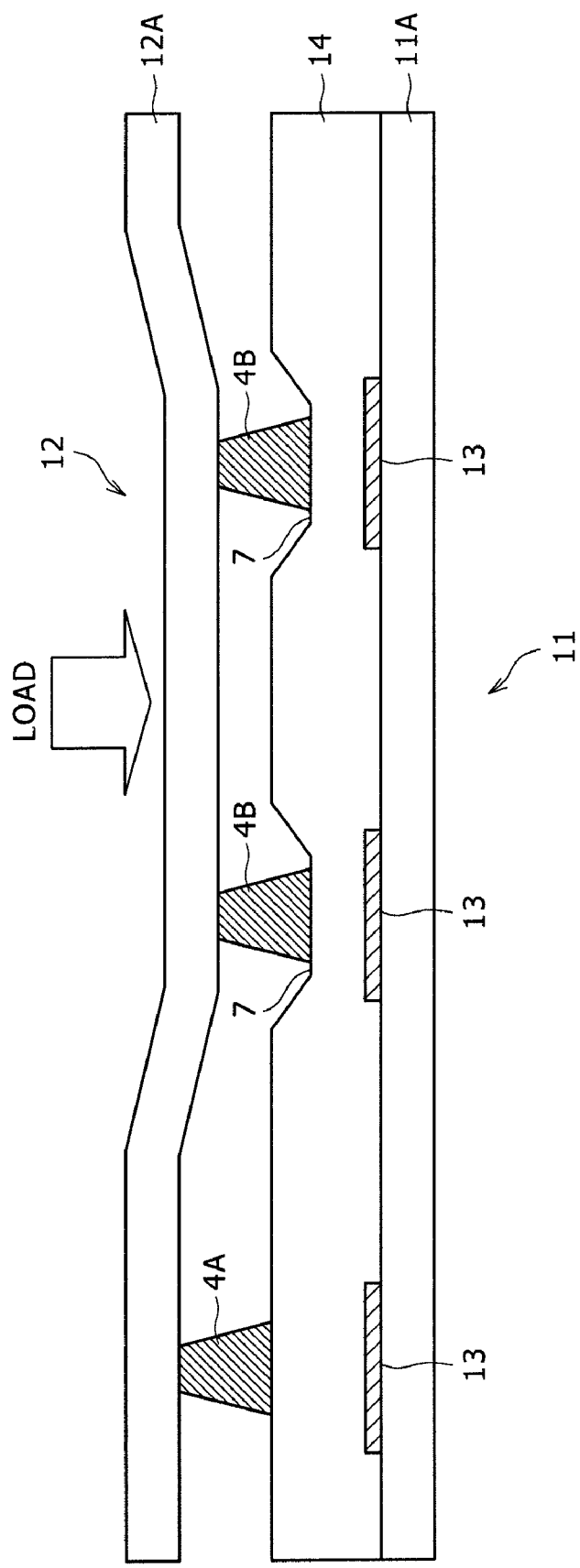
FIG. 9 is a sectional view showing the condition where a load in excess of a predetermined value is exerted on the liquid crystal display device shown in FIG. 8.

On the other hand, in the case where the load exceeds the predetermined value, as shown in FIG. 9, the tip parts of the second columnar spacers 4B are brought into contact with the inside surface of the opposite substrate 12 due to deformation of the opposite substrate 12 attendant on the application of the load, while the tip parts of the first columnar spacers 4A are kept in contact with the inside surface of the opposite substrate 12. Therefore, the gap (spacing) between the driving substrate 11 and the opposite substrate 12 is held by both the first columnar spacers 4A and the second columnar spacers 4B. Accordingly, in the case where a load in excess of the predetermined value is exerted, the effective layout density of the columnar spacers 4 supporting the driving substrate 11 and the opposite substrate 12 depends on the layout density of all the columnar spacers 4.

This ensures that, for example, in the case where no load is exerted on the liquid crystal display device 10, even when a volumetric shrinkage is generated due to a lowering in the density of the liquid crystal under low-temperature environments, the elastic shrinkage of the columnar spacers 4 (the first columnar spacers 4A) can follow up to the volumetric shrinkage, since the effective layout density of the columnar spacers 4 is suppressed to a low level. Besides, in the case where an excessive load in excess of the predetermined value is exerted on the liquid crystal display device 10, the effective layout density of the columnar spacers 4 can be increased only in that case. Accordingly, it is possible to realize a highly pressure-resistant liquid crystal display device 10 in which generation of bubbles under low-temperature environments can be prevented.

Besides, in providing the driving substrate 11 with the recesses 7, the upper surface of the flattening film 14 is locally hollowed correspondingly to the parts where the second columnar spacers 4B are disposed at the time of adhesion of the driving substrate 11 and the opposite substrate 12 to each other, whereby the thus hollowed recesses 7 are formed in the upper surface of the flattening film 14. Since the flattening film 14 is formed as a thick film for the purpose of flattening literally, even when the upper surface is locally hollowed, for example, by about 1.5 μm, it does not produce any problem on the basis of the function of the liquid crystal display device 10. In addition, the flattening film 14 on the driving substrate 11 forms a component which is indispensable as an under film for forming transparent electrodes (described later) in a flat form. Therefore, in forming the recesses 7 by hollowing some parts (the parts where to dispose the second columnar spacers 4B) of the flattening film 14 that is originally present as a component of the liquid crystal display device 10, positional interference with, for example, electrode parts, wiring parts and insulating parts which constitute pixel circuits would not occur. Accordingly, the degree of freedom of layout in the case of providing the driving substrate 11 with the recesses 7 is high.

Figure 10:
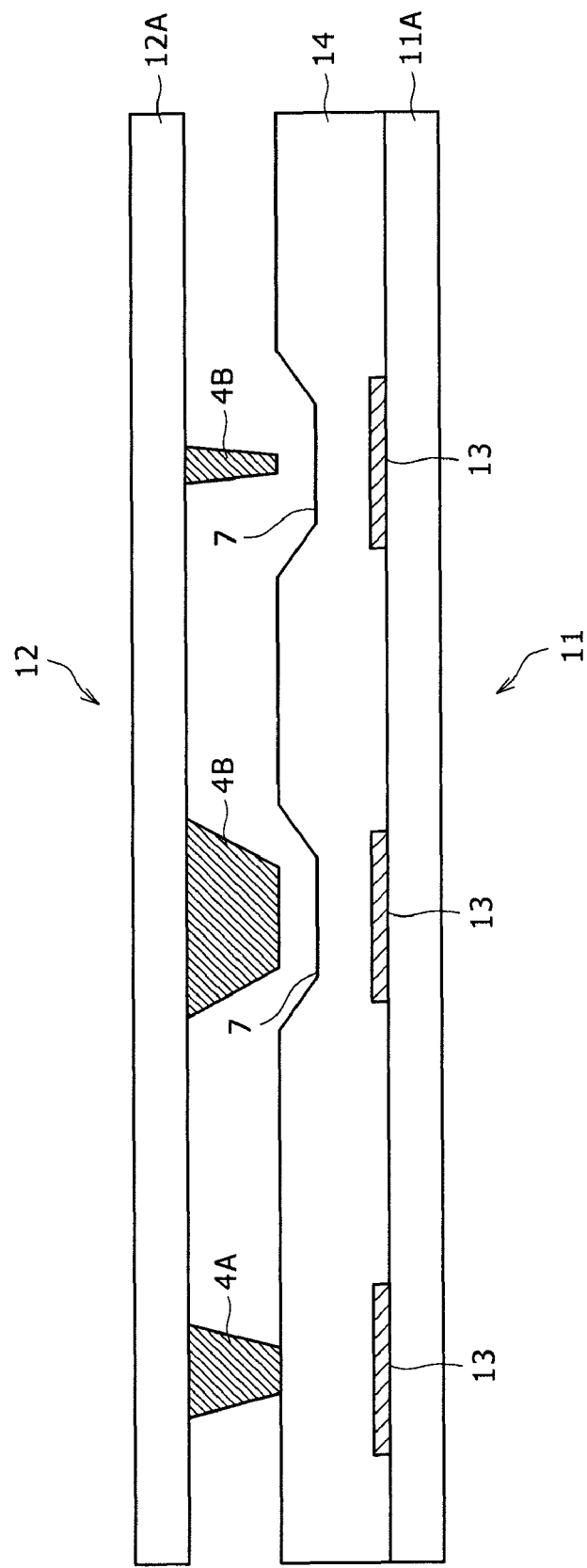
FIG. 10 illustrates interrelations between columnar spacers.

Incidentally, the outer diameters of the columnar spacers 4 may not necessarily be all equal; for example, as shown in FIG. 10, the outer diameter of the second columnar spacers 4B may be set to be greater or smaller than the outer diameter of the first columnar spacers 4A. In addition, the sectional shape of the columnar spacers 4 may not necessarily be a circle, and it may, for example, be a polygon such as a tetragon and a hexagon, though not shown. Besides, the plan-view shape of the recesses 7 may be changed according to the sectional shape of the columnar spacers 4.

EXAMPLE

Figure 11:
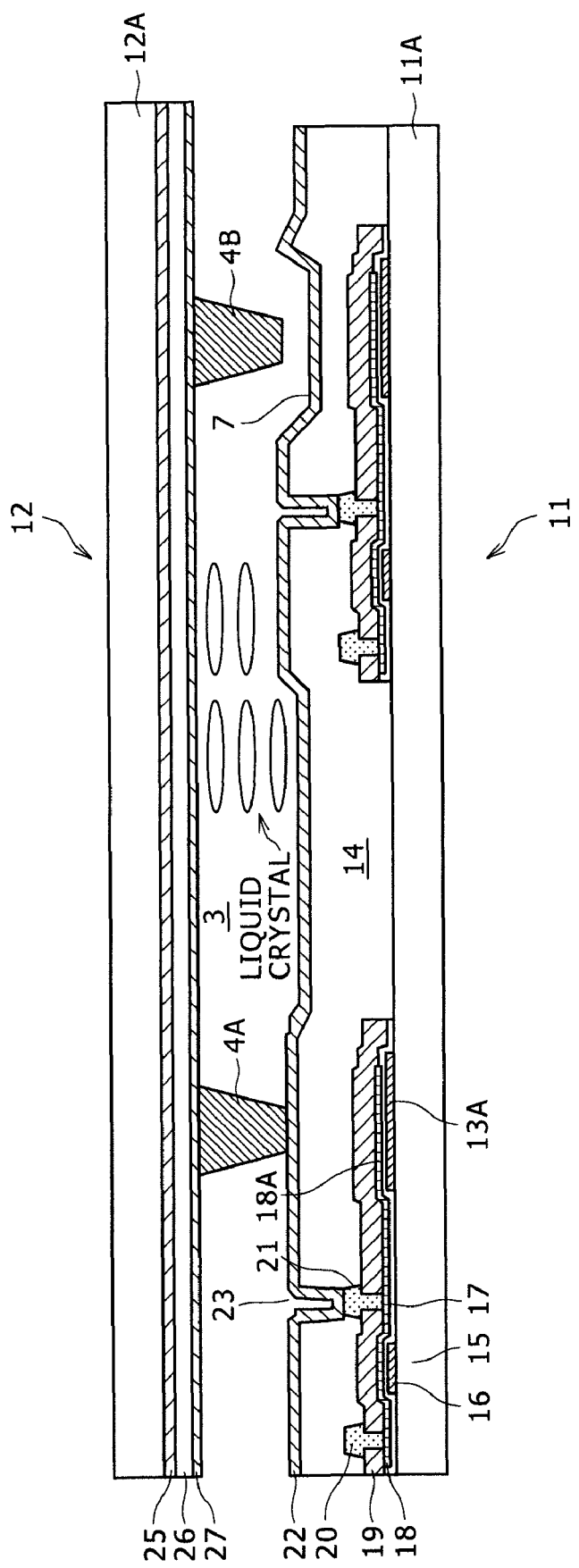
FIG. 11 is an essential part sectional view showing a configuration example of the liquid crystal display device according to an example of the invention.

FIG. 11 is an essential part sectional view showing a configuration example of a liquid crystal display device according to a working example of the present invention. As shown in the figure, a thin film transistor 15 is provided on a glass substrate 11A constituting a base of a driving substrate 11, together with a capacitance electrode 13A which serves also as the above-mentioned light shielding film 13. The thin film transistor 15 forms a switching element for selectively driving a pixel. The thin film transistor 15 includes a gate electrode 16 connected to a gate wire (scanning line), a gate insulator film 17 covering the gate electrode 16, a polysilicon layer 18 laminated on the gate insulator film 17, and an insulating film 19 covering the polysilicon layer 18. In addition, a flattening film 14 is formed over the driving substrate 11 in the state of covering the thin film transistors 15, storage capacitance elements (described later), etc.

The gate electrode 16 and the capacitance electrode 13A are each includes a metallic material such as molybdenum, for example. The gate insulator film 17 is formed over the glass substrate 11A of the driving substrate 11 in the state of covering both the gate electrodes 16 and the capacitance electrodes 13A. On the polysilicon layer 18, the insulating film 19 is laminated in the state of covering the polysilicon layer 18. In addition, a part 18A of the polysilicon layer 18 faces the capacitance electrode 13A through the gate insulator film 17 therebetween and as a capacitance electrode which is paired with the capacitance electrode 13A, and the region where the capacitance electrodes face each other constitutes a storage capacitance element. On the opposite sides of the gate electrode 16, a one-side part of the polysilicon layer 18 constitutes a source region, while an other-side part constitutes a drain region. On the other hand, the insulating film 19 is provided with a connection hole (via hole) for connection to the source region of the polysilicon layer 18, and a connection hole (via hole) for connection to the drain region of the polysilicon layer 18. Besides, on the insulating film 19, a signal wire 20 is formed in the state of filling up the connection hole for connection to the source region, and a pixel connection wire 21 is formed in the state of filling up the connection hole for connection to the drain source. The signal wire 20 and the pixel connection wire 21 are each formed from a wiring material such as aluminum, and are each formed in the state of being projected from the insulating film 19.

The flattening film 13 is provided with pixel contact connection holes (via holes) 23 for connection to the pixel connection wire 21. A transparent electrode 22 is formed on the upper surface of the flattening film 14 inclusive of the inside surfaces of the connection holes 23 and exposed surfaces of the pixel connection wires 21. The transparent electrode 22 forms pixel electrodes formed on a unit pixel basis, and is formed by use of a transparent electrode material such as ITO (Indium Tin Oxide). The transparent electrode 22 is covered with an orientation film (for example, polyimide film) which is not shown in the figure.

On the other hand, over the glass substrate 12A serving as a base of the opposite substrate 12, a color filter layer 25, an overcoat layer 26 covering the color filter layer 25, and a transparent electrode 27 covering the overcoat layer 26 are laminated in this order from the side of the glass substrate 12A. The transparent electrode 27 is a common electrode used in common for all the unit pixels. The transparent electrode 27 is covered with an orientation film (for example, polyimide film) which is not shown in the figure. Besides, the liquid crystal layer 3 is formed in the state of facing both the orientation film covering the transparent electrode 22 on the side of the driving substrate 11 and the orientation film covering the transparent electrode 27 on the side of the opposite substrate 12.

Figure 12:
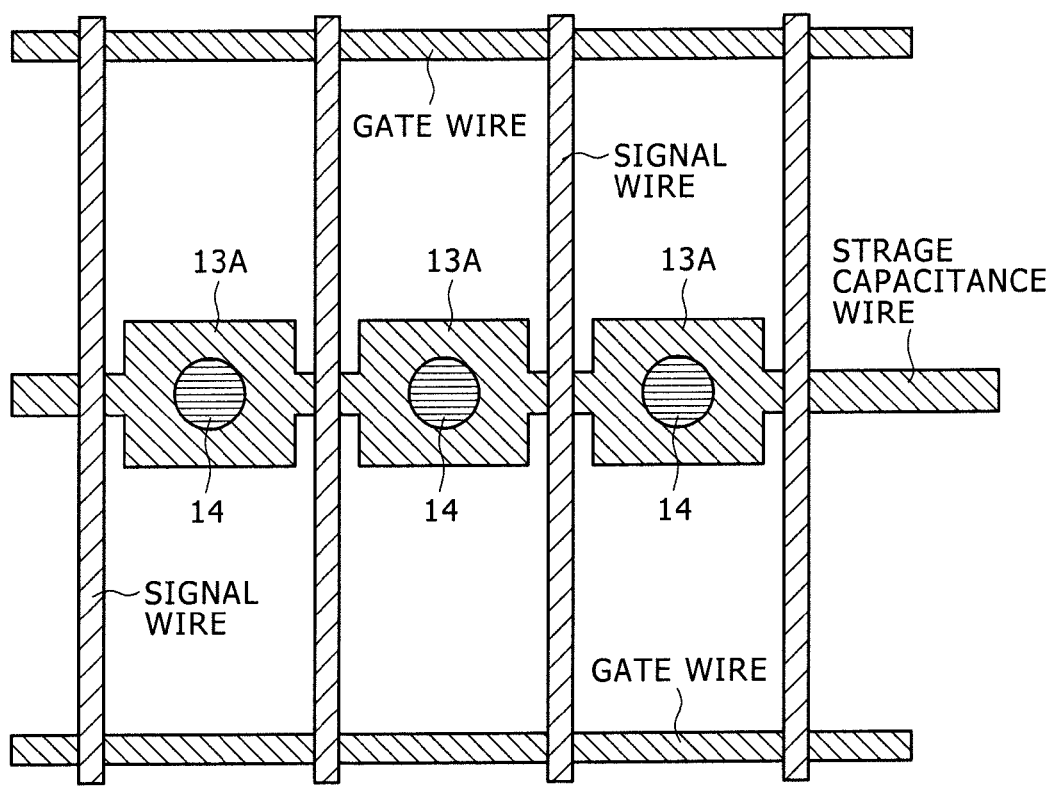
FIG. 12 is a plan view showing a layout example of columnar spacers and capacitance electrodes.

The first columnar spacer 4A and the second columnar spacer 4B are formed on the opposite substrate 12 in the state of making intimate contact with the opposite substrate 12. Specifically, the first columnar spacer 4A and the second columnar spacer 4B are formed in the state of being projected from the transparent electrode 27 of the opposite substrate 12. Therefore, base end parts of both the columnar spacers 4A and 4B are formed in the state of making intimate contact with the transparent electrode 27 on the opposite substrate 12. The columnar spacers 4 inclusive of the first columnar spacers 4A and the second columnar spacers 4B are each disposed in the state of overlapping with the capacitance electrode 13A, preferably in the state of overlapping with a central part of the capacitance electrode 13, in plan view of the liquid crystal display device 10 from the side of the opposite substrate 12, as shown in FIG. 12.

On the other hand, the driving substrate 11 is provided with the recesses 7. The recesses 7 are formed in a hollowed form in the upper surface of the flattening film 14 while being located at parts where the second columnar spacers 4B are disposed. Therefore, a gap (spacing) corresponding to the recess size of the recesses 7 is secured between the tip parts of the second columnar spacers 4B and the transparent electrode 22 covering the bottom surfaces of the recesses 7. Accordingly, when the innermost surface of the driving substrate 11 is presumed to be an electrode surface of the transparent electrode 22, the tip parts of the second columnar spacers 4B are disposed in the state of being out of contact with (or separate from) the electrode surface of the transparent electrode 22 due to the intermediate presence of the recesses 7, whereas the tip parts of the first columnar spacers 4A are disposed in contact with the electrode surface of the transparent electrode 22.

In the liquid crystal display device 10 configured as above, in the case where the load is not more than a predetermined value (inclusive of the case where the load is zero), the tip parts of the first columnar spacers 4A are disposed in the state of making contact with the transparent electrode 22 on the driving substrate 11, whereas the tip parts of the second columnar spacers 4B formed on the opposite substrate 12 so as to face the recesses 7 in the driving substrate 11 are disposed in the state of being out of contact with (or separate from) the transparent electrode 22 on the driving substrate 11. Therefore, the gap (spacing) between the driving substrate 11 and the opposite substrate 12 is held by only the first columnar spacers 4A. Accordingly, in the case where a load of not more than a predetermined value is exerted, the effective layout density of the columnar spacers 4 supporting the driving substrate 11 and the opposite substrate 12 depends on the layout density of the first columnar spacers 4A.

On the other hand, in the case where the load exceeds the predetermined value, the tip parts of the second columnar spacers 4B are brought into contact with the transparent electrode 22 covering the bottom surfaces of the recesses 7 due to deformation of the opposite substrate 12 attendant on the application of the load, as shown in FIG. 13, while the tip parts of the first columnar spacers 4A are kept in contact with the transparent electrode 22 on the driving substrate 11. Therefore, the gap (spacing) between the driving substrate 11 and the opposite substrate 12 is held by both the first columnar spacers 4A and the second columnar spacers 4B. Accordingly, in the case where a load in excess of the predetermined value is exerted, the effective layout density of the columnar spacers 4 supporting the driving substrate 11 and the opposite substrate 12 depends on the layout density of all the columnar spacers 4.

This ensures that, for example, in the case where no load is exerted on the liquid crystal display device 10, even when a volumetric shrinkage is generated due to a lowering in the density of the liquid crystal under low-temperature environments, the elastic shrinkage of the columnar spacers 4 (the first columnar spacers 4A) can follow up to the volumetric shrinkage, since the effective layout density of the columnar spacers 4 is suppressed to a low level. Besides, in the case where an excessive load in excess of the predetermined value is exerted on the liquid crystal display device 10, the effective layout density of the columnar spacers 4 can be increased only in that case. Accordingly, it is possible to realize a highly pressure-resistant liquid crystal display device 10 in which generation of bubbles under low-temperature environments can be prevented.

Now, a method of manufacturing the liquid crystal display device according to an embodiment of the present invention, particularly, a method to be applied to the case where the driving substrate 11 is provided with the recesses 7, will be described below.

<First Manufacturing Method>

FIGS. 14A to 14C illustrate a first method of manufacturing a liquid crystal display device according to one embodiment of the present invention. As shown in FIG. 14A, capacitance electrodes 13A, thin film transistors 15, an insulating film 19, signal wires 20, etc. as above-mentioned are formed on a glass substrate 11A prepared as a base of a driving circuit 11, by applying a film forming process and a patterning process which have been known, and then a slurry form organic resin material as a photosensitive layer is applied onto the glass substrate 11A in the state of covering these components, to form a flattening film 14 from the photosensitive material (organic resin material). In this case, the thickness of the flattening film 14 is set to 3 μm, for example. Since the signal wires 20 are projected from the insulating film 19 at the stage before formation of the flattening film 14, the formation of the flattening film 14 so as to cover the thus projected signal wires 20 results in that some parts (hereinafter referred to as "the projected parts") 14A of the flattening film 14 are projected to the upper side at positions just above the signal wires 20. Incidentally, in FIGS. 14A to 14C, for convenience of description, the condition where the upper surface of the driving substrate 11 (the glass substrate 11A) is simply covered with the insulating film 19 is shown in a simplified form.

Next, as shown in FIG. 14B, the flattening film 14 is exposed to light by irradiating the upper surface of the flattening film 14 with light using an exposure mask 29 provided with apertures 28A, 28B in its parts facing the projected parts 14A of the flattening film 14 and its parts facing the portion where to form recesses 7. As a result, the upper surface of the flattening film 14 is exposed to light selectively in the areas of the projected parts 14A and the portions where to form the recesses 7. The exposure of the projected parts 14A of the flattening film 14 to light is conducted for removing the parts by development, for the purpose of flattening. In this case, the flattening film 14 is formed by use of a positive-type photosensitive material such that the exposed parts become soluble in a developing solution.

Thereafter, the flattening film 14 is developed by use of a developing solution, so as to remove the projected parts 14A from the upper surface of the flattening film 14 and to form the recesses 7 in the upper surface of the flattening film 14, as shown in FIG. 14C. The recesses 7 are formed in a hollowed shape in the areas exposed to light through the apertures 28B in the exposure mask 29.

By manufacturing the liquid crystal display device by the method as above-mentioned, the recesses 7 can be formed in the upper surface of the flattening film 14 during the exposure and development steps carried out for removing the projected parts 14A after formation of the flattening film 14. Therefore, a structure with recesses can be formed on the driving substrate 11, without needing any special new step.

<Second Manufacturing Method>

FIGS. 15A to 15C and 16A to 16B illustrate a second method of manufacturing a liquid crystal display device according to one embodiment of the present invention. First, as shown in FIG. 15A, capacitance electrodes 13A, thin film transistors 15, an insulating film 19, signal wires 20, etc. as above-mentioned are formed on a glass substrate 11A prepared as a base of a driving substrate 11 by applying a film forming process and a patterning process which have been known, and then an organic resin material in a slurry form, for example, is applied as a photosensitive material onto the glass substrate 11A in the state of covering these components, to form a flattening film 14 from the photosensitive material (organic resin material). In this case, the thickness of the flattening film 14 is set to 3 μm, for example.

Thereafter, as shown in FIG. 15B, the upper surface of the flattening film 14 is irradiated with light by use of a first exposure mask 31 provided with apertures 30 in its parts facing the portions where to form the above-mentioned pixel contact connection holes 23, whereby the flattening film 14 is exposed to light. As a result, the upper surface of the flattening film 14 is exposed to light selectively in the areas where to form the connection holes 23. In this case, the flattening film 14 is formed by use of a positive-type photosensitive material such that the exposed parts become soluble in a developing solution. Next, as shown in FIG. 15C, the flattening film 14 is exposed to light by irradiating the flattening film 14 with light while using a second exposure mask 33 provided with apertures 32 in its parts facing the portions where to form recesses 7. As a result, the upper surface of the flattening film 14 is exposed to light selectively in the areas where to form the recesses 7.

Figure 16A:
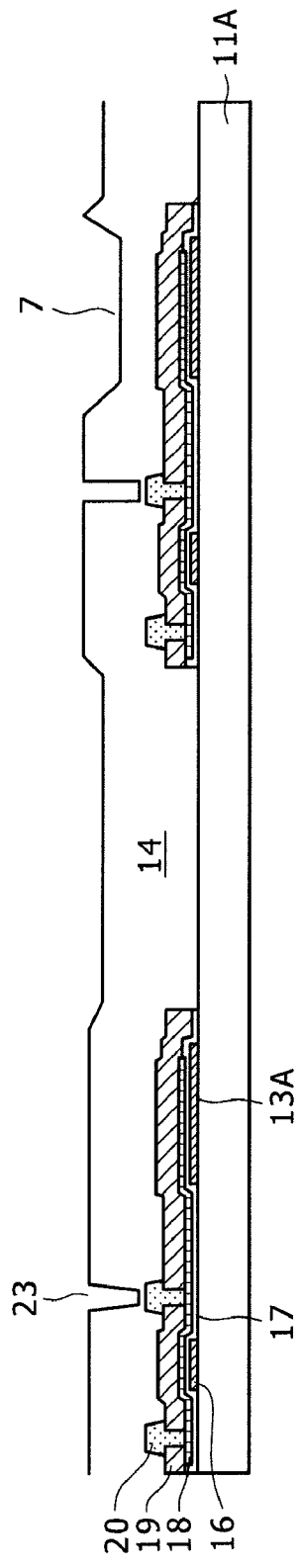
FIGS. 16A and 16B are illustrations (No. 2) of the second method of manufacturing a liquid crystal display device according to one embodiment of the invention.
Figure 16B:
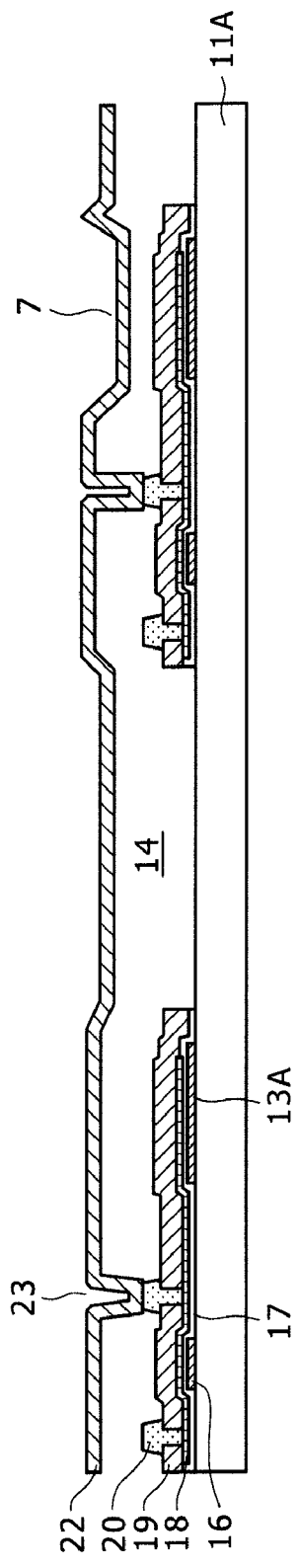

Thereafter, the flattening film 14 is developed by use of a developing solution, to form the pixel contact connection holes (via holes) 23 in the flattening film 14, and, simultaneously, to form the recesses 7 in the upper surface of the flattening film 14. The pixel contact connection holes 23 are formed in the state of partially exposing the surfaces (upper surfaces) of the signal wires 20. The recesses 7 are formed in a hollowed shape in the areas exposed to light through the apertures 32 in the second exposure mask 33. Subsequently, as shown in FIG. 16B, a transparent electrode 22 is formed in the state of covering the upper surface of the flattening film 14. The transparent electrode 22 is formed, for example, by forming a film of ITO by sputtering and then pattering the ITO film so as to partition it on a unit pixel basis.

By manufacturing the liquid crystal display device by the method as above-mentioned, the recesses 7 can be formed in the upper surface of the flattening film 14 during the exposure and development steps carried out for forming the pixel contact connection holes 23 after formation of the flattening film 14. Therefore, a structure with recesses can be formed on the driving substrate 11, without needing any special new step. In addition, since the exposure to light of the portion where to form the recesses 7 is carried out using the exclusive-use exposure mask 33, the portions where to form the recesses 7 can be exposed to light in a desired exposure, irrespectively of the portions where to form the pixel contact holes 23. Therefore, the recess size of the recesses 7 can be controlled accurately.

While the exposure to light of the portions where to form the pixel contact connection holes 23 and the exposure to light of the portions where to form the recesses 7 have been carried out sequentially (in divided two steps) by use of the respective exclusive-use exposure masks 31 and 33 in the above-described second manufacturing method, this is not limitative. In other words, the exposure to light of the portions where to form the pixel contact connection holes 23 and the exposure to light of the portions where to form the recesses 7 may be carried out simultaneously. A specific example is as follows. Though not shown, a half-tone mask of which the parts corresponding to the areas where to form the pixel contact connection holes are composed of a semi-transmitting film is used. In this case, for example, the portions where to form the pixel contact connection holes are exposed to light in a predetermined exposure necessary for formation of the connection holes, to be "fully exposed parts"; the portions where to form the recesses 7 are exposed to light in an exposure of about ⅓ times the predetermined exposure, for example, to be "medium-exposed parts"; and the other portions are left as "unexposed parts." In this manner, the exposing treatment of the flattening film 14 can be completed in a single step.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a liquid crystal layer;
a first substrate and a second substrate which face each other through said liquid crystal layer therebetween; and
a plurality of columnar spacers holding a gap between said first substrate and said second substrate,
wherein said plurality of columnar spacers include a first columnar spacer and a second columnar spacer which are formed to be substantially equal in height,
wherein at least an inner substrate surface of one of said first substrate and said second substrate is provided with a hollowed recess in at least one part where said first column spacer gap and/or said second column spacer gap are disposed.

2. The liquid crystal display device as set forth in claim 1, wherein said plurality of columnar spacers are formed on the other of said substrates in the state of making intimate contact with a substrate surface of said other substrate.

3. The liquid crystal display device as set forth in claim 1, wherein said plurality of columnar spacers are formed on said one of said substrates in the state of making intimate contact with said substrate surface of said one substrate.

4. The liquid crystal display device as set forth in claim 1, wherein said one of said substrates has a driving substrate which includes switching elements for selective driving of pixels, an insulating film covering said switching elements, and a flattening film covering said insulating film.

5. A method of manufacturing a liquid crystal display device, including, a liquid crystal layer; a first substrate and a second substrate which face each other through said liquid crystal layer therebetween; and a plurality of columnar spacers holding a gap between said first substrate and said second substrate, wherein said plurality of columnar spacers including a first columnar spacer and a second columnar spacer which are formed to be substantially equal in height, a substrate surface of one of said first substrate and said second substrate being provided with a recess in at least one of a part where to dispose said first columnar spacer and a part where to dispose said second columnar spacer, said one substrate having a driving substrate which includes switching elements for selective driving of pixels, an insulating film covering said switching elements, and a flattening film covering said insulating film, and said recess being formed in a hollowed shape in an upper surface of said flattening film, comprising:
a first step of applying a photosensitive material onto said driving substrate so as to cover said insulating film, thereby forming said flattening film from said photosensitive material;
a second step of subjecting to an exposure treatment a projected part projected due to wiring and a part where to form said recess, of said flattening film formed in said first step; and
a third step of developing said flattening film having undergone said exposure treatment in said second step, whereby said projected part is removed from said flattening film and said recess is formed in said flattening film.

6. A method of manufacturing a liquid crystal display device including, a liquid crystal layer; a first substrate and a second substrate which face each other through said liquid crystal layer therebetween; and a plurality of columnar spacers holding a gap between said first substrate and said second substrate, wherein said plurality of columnar spacers including a first columnar spacer and a second columnar spacer which are formed to be substantially equal in height, a substrate surface of one of said first substrate and said second substrate being provided with a recess in at least one of a part where to dispose said first columnar spacer and a part where to dispose said second columnar spacer, said one substrate having a driving substrate which includes switching elements for selective driving of pixels, an insulating film covering said switching elements, and a flattening film covering said insulating film, and said recess being formed in a hollowed shape in an upper surface of said flattening film, comprising:
a first step of applying a photosensitive material onto said driving substrate so as to cover said insulating film, thereby forming said flattening film from said photosensitive material;
a second step of performing sequentially or simultaneously a treatment in which parts, where to form pixel contact connection holes, of said flattening film formed in said first step are exposed to light and a treatment in which a part, where to form said recess, of said flattening film is exposed to light; and
a third step of developing said flattening film having undergone said exposure treatment in said second step, whereby said pixel contact connection holes and said recess are formed in said flattening film.

* * * * *